G. H. Hawkins.
Bonnet.
No. 35,934. Patented July 22, 1862.
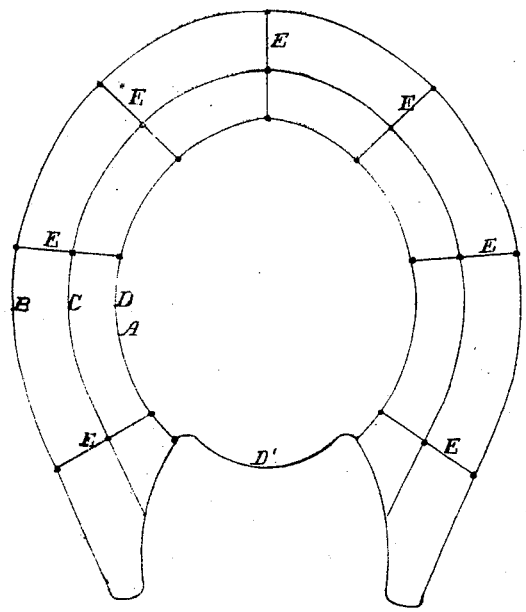
Fig. 1
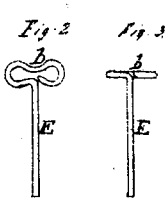 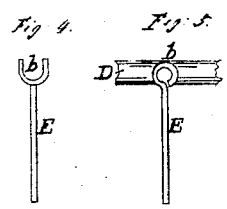
Fig. 2  Fig. 3  Fig. 4  Fig. 5
WITNESSES
J. F. Buckley
M. M. Livingston
INVENTOR
G. H. Hawkins
per Munn
Attorneys

UNITED STATES PATENT OFFICE.

GEORGE H. HAWKINS, OF NEW YORK, N. Y.

IMPROVEMENT IN BONNET-FRAMES.

Specification forming part of Letters Patent No. 35,934, dated July 22, 1862.

*To all whom it may concern:*

Be it known that I, GEORGE H. HAWKINS, of the city, county, and State of New York, have invented a new and Improved Bonnet-Frame; and I do hereby declare that the following is a full, clear, and exact description of the same, reference being had to the accompanying drawings, forming a part of this specification, in which—

Figure 1 represents an inside view of a bonnet-frame made according to my invention. Figs. 2, 3, 4, 5 are detached views of the braces in different stages of the manufacture.

Similar letters of reference in the several figures indicate corresponding parts.

This invention consists in a bonnet-frame made of a series of wires and braces, as will be hereinafter described, said braces being looped at the ends and soldered to the wires at the several points of contact, the whole being united with a suitable crown and covered with a net or its equivalent in such a manner that a light, strong, cheap, and durable bonnet-frame is produced.

To enable those skilled in the art to make and use my invention, I will proceed to describe it with reference to the drawings.

My bonnet-frame A consists of a series of wires, B C D D', which are bent over a suitable frame so that they assume the required shape, as shown in Fig. 1 of the drawings. These wires are connected and retained in the desired relation toward each other by means of braces E, the ends of which are formed into loops $b$, substantially of the shape shown in Fig. 2 of the drawings. These loops are then turned down to the position shown in Fig. 3, and the ends of the loops are turned up, as shown in Fig. 4, when they are ready to be attached to the wires B C D. The principal object of these loops is to bring the ends of the braces in such a form that the same can be firmly attached to the wires by a pair of nippers or by any other suitable means, and that they retain the wires and braces firmly in position until the same are secured together by means of solder. The wire which I use for my bonnet-frames is uncovered, and the braces can be fastened to the wires B C D either by dipping the whole frame into fused tin or soft solder, or the points of contact alone may be so dipped or otherwise soldered together. By these means all parts of the bonnet-frame can be easily and quickly united, and a firm, durable, and light bonnet-frame can be produced at less expense than ordinary bonnet-frames.

Having thus fully described my invention, what I claim as new, and desire to secure by Letters Patent, is—

A bonnet-frame, A, consisting of wires B C D D' and braces E, said braces being looped at the ends and soldered to the wires B C D at the several points of contact when united with a suitable crown and covered with a net or its equivalent, all substantially as shown and described.

GEO. H. HAWKINS.

Witnesses:
JAMES LAIRD,
D. R. GAWLEY.